United States Patent Office 3,455,929
Patented July 15, 1969

3,455,929
ESTERS OF 1,4-DIHYDROQUINOLINE-N-CARBOX-YLIC ACIDS AND THIONE ACIDS
Bernard Belleau, Ottawa, Ontario, and Marcel Menard, Candiac, Quebec, Canada, assignors, by mesne assignments, to Bristol-Myers Company, New York, N.Y., a corporation of Delaware
No Drawing. Filed Aug. 15, 1966, Ser. No. 572,195
Int. Cl. C07d 33/48; A61k 27/00
U.S. Cl. 260—287      18 Claims

ABSTRACT OF THE DISCLOSURE

Esters of 1,4-dihydroquinoline-N-carboxylic acids and thione acids exhibit tranquilizing, sedative and hypotensive activity and are useful as tranquilizing, sedative and hypotensive agents in mammals.

---

This invention relates to certain novel tranquilizing, sedative and hypotensive agents and, more particularly, to certain esters of 1,4-dihydroquinoline-N-carboxylic acid, certain substituted 1,4-dihydroquinoline-N-carboxylic acids and the corresponding thione acids. In another aspect, this invention relates to a method of tranquilizing mammals.

It was the objective of the present invention to provide novel tranquilizing, sedative and hypotensive agents. It was another objective of the present invention to discover chemicals with these properties which would be well-absorbed upon oral administration to mammals. A third objective was to provide such activity in chemicals of a relatively simple structure in which pharmacological activity is usually completely lacking and in which there would not be present the complex structural features which often lead to toxic manifestations or to physiological activity of a type which is not desired and thus becomes an unwanted side-effect.

The objectives of the present invention have been achieved by the provision, according to the present invention, of the compounds of the formula (I)

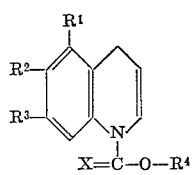

$$X=\overset{|}{C}-O-R^4$$

wherein $R^1$, $R^2$ and $R^3$ are the same or different and each represent hydrogen, chloro, bromo, iodo, fluoro, trifluoromethyl, (lower)alkyl, (lower)alkoxy, (lower)alkylthio, (lower)alkylsulfonyl, hydroxy, (lower)alkanoyloxy, amino, alkoxycarbonylamino or a group of the formula (II)

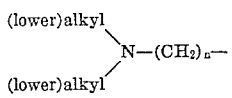

wherein $n$ is an integer from 0 to 3 inclusive;
X represents oxygen or sulfur; and
$R^4$ represents hydrocarbonyl and particularly (lower)alkyl, (lower)alkenyl, (lower)alkynyl, cycloalkyl containing from 3 to 8 carbon atoms inclusive, halo(lower)alkyl other than α-haloalkyl or aralkyl and particularly a radical of the formula (III)

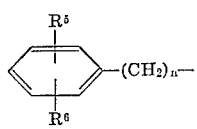

wherein $n$ is an integer from 1 to 3 inclusive and $R^5$ and $R^6$ each represent hydrogen, (lower)alkyl, (lower)alkoxy, chloro, bromo, iodo, fluoro or trifluoromethyl.

The term hydrocarbonyl as used herein means a monovalent non-aromatic radical containing only the elements carbon and hydrogen and containing less than 11 carbon atoms; example of such a hydrocarbonyl group include ethyl, allyl, propargyl, cyclopropyl, cycloheptyl, cycloheptenyl, mono- or poly-methylcyclohexyl.

Two preferred embodiments of the present invention are the compounds of the formula (IV)

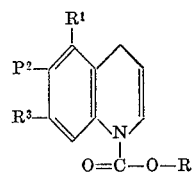

$$O=\overset{|}{C}-O-R$$

wherein R represents (lower)alkyl and
$R^1$, $R^2$ and $R^3$ each represent hydrogen, (lower)alkyl, chloro, bromo, iodo, amino, alkoxycarbonylamino or di(lower)alkylamino
and the compounds of the formula (V)

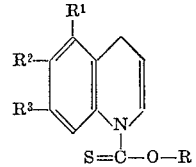

$$S=\overset{|}{C}-O-R$$

wherein R represents (lower)alkyl and
$R^1$, $R^2$ and $R^3$ each represent hydrogen, (lower)alkyl, chloro, bromo, iodo, amino, alkoxycarbonylamino or di(lower)alkylamino.

Particularly preferred embodiments of the present invention are the hydrocarbonyl esters of 1,4-dihydroquinoline-N-carboxylic acid and especially the (lower)alkyl esters such as the methyl, ethyl and n-propyl esters.

The compounds of the formula (VI)

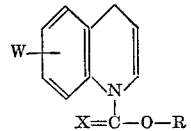

$$X=\overset{|}{C}-O-R$$

wherein W represents hydrogen, methyl, amino, alkoxycarbonylamino, di(lower)alkylamino or halogen and is attached to the 5, 6 or 7-position;
X represents oxygen or sulfur; and
R represents (lower)alkyl and the compounds of the formula (VII)

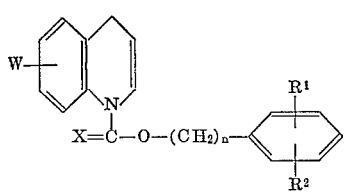

wherein W represents methyl, halogen, amino, alkoxycarbonylamino or di(lower)alkylamino and is attached at the 5, 6, or 7-position;
X represents oxygen or sulfur;
$n$ is one, two or three; and
$R^1$ and $R^2$ each represent hydrogen, (lower)alkyl, (lower)alkoxy, chloro, bromo, iodo, fluoro, or trifluoromethyl;

and their nontoxic, pharmaceutically acceptable acid addition salts constitute a relatively limited, preferred embodiment of the present invention.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g., (lower)alkoxy, it refers to the alkyl portion of such group which is therefore as described above in connection with (lower)alkyl.

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower)alkanoyl includes acetyl, propionyl, butyryl, etc.; (lower)alkysulfonyl includes methylsulfonyl, ethysulfonyl, hexylsulfonyl, etc.; di(lower)alkylamino includes dimethylamino, diethylamino, ethylmethylamino, etc.

Most of the compounds of the present invention may be regarded as nonbasic amides and in any event do not form ordinary, stable acid addition salts. However, those which contain basic groups at the 5-, 6- or 7-position such as amino, di(lower)alkylamino or di(lower)alkylaminoalkyl groups, do form useful, nontoxic pharmaceutically acceptable acid addition salts with both organic and inorganic acids, e.g. glycolic, citric, maleic, succinic, acetic, ascorbic, gluconic, palmitic, oleic, lactic, pantothenic, sulfuric, hydrochloric, nitric, phosphoric, hydrobromic, hydriodic and the like. When compared to the liquid nature of many of the compounds of the present invention, many of these salts are of particular value in pharmaceutical formulations because their solid, crystalline nature increases ease of handling.

The compounds of the present invention are prepared as exemplified below by reaction of the appropriate 1,2,3,-4-tetrahydroquinoline with a dehydration or dealkoxylation agent, e.g., dimethylsulfoxide, according to the following reaction scheme:

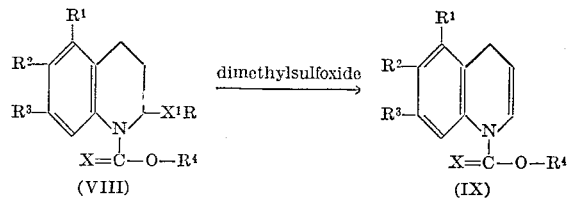

wherein $X^1$ is oxygen or sulfur, R is hydrogen or lower alkyl and X, $R^1$, $R^2$, $R^3$ and $R^4$ have the meanings set forth above.

The reaction is preferably carried out at elevated temperature, e.g., reflux temperature.

Any known dehydration or dealkoxylation agent can be used in the foregoing reaction. For example, dimethylsulfoxide may be replaced by sulfuric acid or toluene sulfonic acid in a solvent such as benzene, toluene or xylene. A general procedure using toluene sulfonic acid is described by Mauger et al., J. Am. Chem. Soc. 88, 2019 (1966).

Alternatively, the compounds of the present invention are prepared by the one step process described under B below.

The substituted 1,2,3,4-tetrahydroquinolines used as starting materials in the synthesis of the compounds of the present invention are prepared as follows:

(A) A compound of the formula (X)

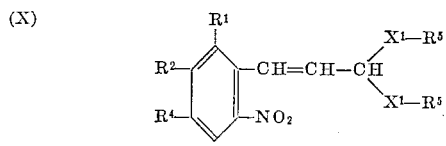

wherein $R^5$ is (lower)alkyl and when both of $R^5$ are taken together with (XI)

constitute a heterocyclic ring of the formula (XII)

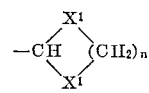

wherein $n$ is a whole integer from 2 to 3 inclusive, and $X^1$, $R^1$, $R^2$ and $R^3$ have the meaning set forth above, is reduced for example by hydrogenation in the presence of Raney nickel catalysis to produce a compound of the formula (XIII)

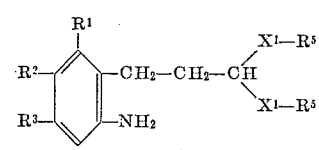

wherein $X^1$, $R^1$, $R^2$, $R^3$, and $R^5$ have the meanings set forth above.

(B) A compound of Formula XIII is acylated with a chloroformate or a chlorothionformate of the formula (XIV)

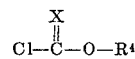

wherein X and $R^4$ have the meanings set forth above, to produce an acetal of the formula

XV

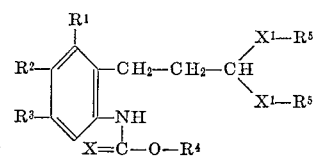

wherein X, $X^1$, $R^1$, $R^2$, $R^3$, $R^4$ and $R^5$ have the meanings set forth above. The reaction is conducted using at least an equimolar weight of the chloroformate at a temperature of about 0° C. to room temperature or even up to 50° C., and preferably in an inert solvent such as benzene. Before adding the chloroformate, it is preferable to add at least an equimolar weight, and preferably several, of a tertiary amine such as triethylamine or pyridine to trap the hydrogen chloride formed in the reaction; alternatively, the tertiary amine can, if liquid, be used as the solvent itself. This reaction can also be carried out under Schotten-Baumann conditions, i.e., in water with a suitable inorganic base such as sodium or potassium hydroxide.

The compounds of Formula XV can be converted in one step into the compounds of the present invention by warming with a suitable acid such as sulfuric or toluenesulfonic acid in a solvent such as benzene, toluene or xylene, according to the following reaction scheme:

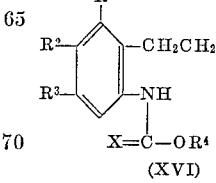 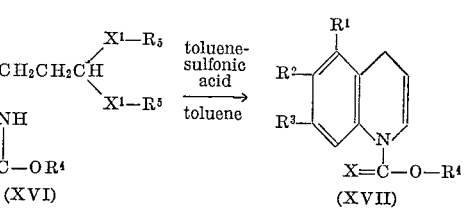

wherein $R^1$, $R^2$, $R^3$, $R^4$, $R^5$, X and $X^1$ are as represented above.

C. Acid hydrolysis of the acetal of Formula XV with, for example, a dilute acid such as hydrochloric, produces a mixture of compounds of the formulae (XVIII)

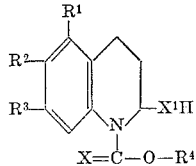

and (XV)

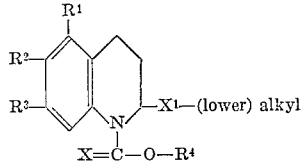

The individual compounds are readily separated by chromatography e.g., by use of an alumina column. However, separation is not necessary as the mixture of the two compounds, as exemplified below, can be used in the procedure described above to prepare the compounds of this invention.

The starting materials of Formula X, used in step A., above, are prepared by the procedure described by Klein et al., J. Am. Chem. Soc., 79, 3452–4, (1957).

The reagents of the formulae (XVI)

and (XVII)

wherein $R^4$ has the meaning set forth above, used in step B. above, are prepared, for example, by reaction of phosgene or thiophosgene with the appropriate alcohol or haloalcohol as illustrated on pages 833, 886–899 of Chemistry of Carbon Compounds, edited by E. H. Rodd, volume 1, Part B, "Aliphatic Compounds," Elsevier Publishing Company, New York, N.Y. (1952). References to many such compounds are indexed in Chemical Abstracts as esters under "Formic acid, chloro-," "Formic acid, chlorothion-" and "Formic acid, chlorothio-."

The compounds of this invention when administered orally or parenterally in an effective amount to mammals, are effective in inducing tranquility in mammals.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The following examples are intended to illustrate the invention described herein without unduly restricting it.

EXAMPLE 1

Preparation of ethyl-1,4-dihydroquinoline-N-carboxylate

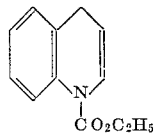

(A) 3-(2-aminophenyl)-propionaldehyde diethylacetal

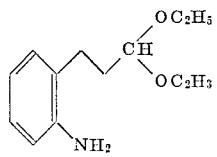

A solution of 15.0 g. (0.06 mole) of o-nitrocinnamaldehyde diethylacetal [J. Klein and E. D. Bergmann, J. Am. Chem. Soc. 79, 3452–4 (1957)] in 100 ml. of absolute ethanol containing one spoonful of "Raney Nickel" is hydrogenated at an initial pressure of 29 p.s.i. of hydrogen. After 35 minutes, the theoretical amount of hydrogen (0.25 mole) is absorbed. Removal of the catalyst by filtration, concentration of the filtrates and distillation gives 7.5 g. of 3 - (2-aminophenyl)-propionaldehyde diethylacetal as a yellow liquid, B.P. 102–110° C./0.3 mm.:

$\nu_{max.}^{liquid}$ 3460, 3375, 1625 (N—H) and 1125 and 1065 cm.$^{-1}$ (C—O—C—O—C).

Analysis.—Calcd. for $C_{13}H_{21}NO_2$: C, 69.91; H, 9.48; N, 6.27. Found: C, 70.89; H, 9.30; N, 6.61.

(B) 3-(2-ethoxycarbamyl phenyl)-propionaldehyde diethylacetal

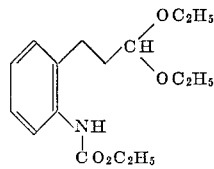

A solution of 50 g. (0.224 mole) of 3-(2-aminophenyl)-propionaldehyde diethylacetal and 50 g. (0.5 mole) of triethylamine in 375 ml. of dry benzene is placed in a three necked flask fitted with a stirrer, a low temperature thermometer and a dropping funnel protected by a drying tube. The solution is cooled to 3–5° C. with an ice-water bath, and 25 g. (0.23 mole) of ethyl chloroformate is added at such a rate that the temperature does not rise above 5° C. The mixture is stirred at 5° C. for two hours and then allowed to come to room temperature overnight. The precipitated triethylamine hydrochloride is removed by filtration and washed with benzene. Concentration of the combined filtrates and distillation give 37.2 g. (56%) of 3-(2-ethoxycarbamyl phenyl)-propionaldehyde diethylacetal as an oil, B.P. 140–145° C./0.5 mm.:

$\nu_{max.}^{liquid}$ 3310 (N—H), 1735 and 1535 (carbamate), 1125 and 1065 cm.$^{-1}$ (C—O—C—O—C).

(C) 2-hydroxy and 3-ethoxy-1-carbethoxy-1,2,3,4-tetrahydroquinoline

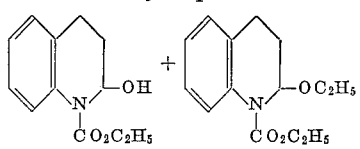

A solution of 14 g. of 3-(2-ethoxy carbamylphenyl)-propionaldehyde diethylacetal and 15 ml. of 10% aqueous hydrochloric acid in 50 ml. of water and 150 ml. of dioxane is allowed to stand for 48 hours. After neutralization with 10% aqueous sodium hydroxide solution the solution is concentrated in vacuo to ca. 50 ml. and extracted with ether (3 × 40 ml.). The combined ether extracts are washed with water (20 ml.), dried and concentrated to leave 15.1 g. of a mixture of 2-hydroxy and 2 - ethoxy-1-carbethoxy-1,2,3,4-tetrahydroquinoline as a yellow oil.

Chromatography of 2.87 g. of the oil over 100 g. of alumina collecting 50 ml. fractions of the eluting dichloromethane gives:

(a) 1.09 g. of pure 1-carbethoxy-2-ethoxy-1,2,3,4-tetrahydroquinoline, B.P. 98–100° C./0.1 mm.:

$\nu_{max.}^{liquid}$ 1700 (carbamate), 1125, 1085 and 1060 cm.$^{-1}$ (C—O).
Analysis.—Calcd. for $C_{14}H_{19}O_3N$: C, 67.45; H, 7.68. Found: C, 67.79; H, 7.58.

(b) A mixture, 0.47 g. (fraction 3)

(c) 1.40 g. (fraction 4 to 8) of pure 1-carbethoxy-2-hydroxy-1,2,3,4-tetrahydroquinoline:

$$\nu_{max.}^{liquid}$$

3450 (O—H), 1690 (carbamate), 1320 and 1050 cm.$^{-1}$ (C—OH).

Distillation (130° C./0.3 mm.) proceeded with some decomposition to N-carbethoxy-1,4-dihydroquinoline. The crude oil crystallized after a few days. Recrystallization from ligroine (90–100° C.) gives the analytical sample, M.P. 52–55° C.

*Analysis.*—Calcd. for $C_{12}H_{15}NO_3$: C, 65.14; H, 6.83; N, 6.33. Found: C, 65.43; H, 7.00; N, 6.37.

Both 2-ethoxy and 2-hydroxyl-1-carbethoxy-1,2,3,4-tetrahydroquinoline, in aqueous methanolic sulfuric acid, give the same 2,4-dinitrophenyl hydrazone; yellow, M.P. 149–515° C. (ethanol).

*Analysis.*—Calcd. for $C_{18}H_{19}N_5O_6$: C, 53.87; H, 4.77; N, 17.45. Found: C, 54.37; H, 4.67; N, 17.38.

A few mls. of dry hydrogen chloride are bubbled through a solution of 1 - carbethoxy-2-hydroxy-1,2,3,4-tetrahydroquinoline (0.243 g.) in absolute ethanol (10 ml.). After standing at room temperature for 18 hours, the solvent is removed in a vacuum at 25° C. The remaining (0.257 g.) has an I.R. spectrum, and thin layer chromatograph which are identical to that of the above sample of 1-carbethoxy-2-ethoxy-1,2,3,4-dihydroquinoline.

(D) ethyl-1,4-dihydroquinoline-N-carboxylate

Preparation 1.—A solution of 17 g. of a mixture of 1-carbethoxy-2-ethoxy-1,2,3,4-tetrahydroquinoline and 1-carbethoxy - 2 - hydroxy-1,2,3,4-tetrahydroquinoline in 50 ml. of dry dimethylsulfoxide is heated under reflux for 48 hours. The cold solution is diluted with water (200 ml.) and extracted with ether (4× 25 ml.). After washing with water, the combined ether extracts are dried, concentrated and distilled to give 6.53 g. of 1-carbethoxy-1,4-dihydroquinoline as a colorless liquid, B.P. 87–97° C./ 0.2 mm.:

$$\nu_{max.}^{liquid}$$

1720 (C=O), 1670 (C=C); N.M.R. (C Cl$_4$), δ 8.01 (H–2), 6.98 (4 aromatic protons), 5.1 (H–3), 4.19 (2 methylene protons of the ester), 3.23 (2 H–4 protons) and 1.27 p.p.m. (3 methyl protons).

*Analysis.*—Calcd. for $C_{12}H_{13}NO_2$: C, 70.92; H, 6.45; N, 6.89. Found: C, 71.10; H, 6.61; N, 7.09.

Preparation 2.—A solution of 1-carbethoxy-2-ethoxy-1,2,3,4-tetrahydroquinoline (0.277 g.) in dry dimethylsulfoxide (2 ml.) is heated under reflux for 48 hours. The solvent is removed in a vacuum (10 mm.) on the steam-bath to leave 0.184 g. of a brownish oil which is dissolved in ether, filtered, concentrated and distilled in a short-path distillation apparatus to give ethyl-1,4-dihydroquinoline-N-carboxylate as a colorless oil (0.17 g.). The I.R. spectrum and thin layer chromatography are identical with that of the product obtained in Preparation 1 above.

Preparation 3.—A solution of 1-carbethoxy-2-hydroxy-1,2,3,4-tetrahydroquinoline (0.384 g.) in dry dimethylsulfoxide (3 ml.) is heated under reflux for 48 hours. The solvent is removed in a vacuum (10 mm.) on the steam bath to give a brownish oil which is dissolved in ether, filtered, concentrated and distilled in a short-path distillation apparatus to give ethyl-1,4-dihydroquinoline-N-carboxylate as a colorless oil (0.067 g.). The I.R. spectrum and thin layer chromatography are identical with that of the product obtained in Preparation 1 above.

The tranquilizing activity of this compound, ethyl-1,4-dihydroquinoline-N-carboxylate, was indicated by its ability at a dose as low as 10 mgm./kg. p.o. in rats to block a conditioned response in the usual test in which the rats are trained to climb a pole when a buzzer is sounded in order to avoid a subsequent electric shock to their feet if they remain on the floor of the cage.

EXAMPLE 2

When, in the procedure of Example 1, ethyl chloroformate is replaced by an equimolar weight of isobutyl chloroformate, isopropyl chloroformate, t-butyl chloroformate, methyl chloroformate, propargyl chloroformate, n-butyl chloroformate, allyl chloroformate, methallyl chloroformate, cyclopropyl chloroformate, cyclohexyl chloroformate, cycloheptenyl chloroformate, benzyl chloroformate, α-phenethyl chloroformate, β-phenethyl chloroformate, β-bromoethyl chloroformate, β-chloroethyl chloroformate, β-iodoethyl chloroformate, β-fluoroethyl chloroformate, γ-chloropropyl chloroformate, δ-chlorobutyl chloroformate, p-methylbenzyl chloroformate, o-methoxybenzyl chloroformate, p-methoxybenzyl chloroformate, o-chlorobenzyl chloroformate, m-bromobenzyl chloroformate, p-iodobenzyl chloroformate, o-fluorobenzyl chloroformate, p-trifluoromethylbenzyl chloroformate, p-chlorophenylisopropyl chloroformate, m-methoxybenzyl chloroformate, o,p-dichlorobenzyl chloroformate, o,o'-dimethoxybenzyl chloroformate and o,p-dimethylbenzyl chloroformate, there are obtained, isobutyl 1,4-dihydroquinoline-N-carboxylate, isopropyl 1,4 - dihydroquinoline-N-carboxylate, t-butyl 1,4-dihydroquinoline-N-carboxylate, methyl 1,4-dihydroquinoline-N-carboxylate, propargyl 1,4 - dihydroquinoline-N-carboxylate, n-butyl 1,4-dihydroquinoline-N-carboxylate, allyl 1,4 - dihydroquinoline - N - carboxylate, methallyl 1,4-dihydroquinoline-N-carboxylate, cyclopropyl 1,4-dihydroquinoline-N-carboxylate, cyclohexyl 1,4-dihydroquinoline-N-carboxylate, cycloheptenyl 1,4 - dihydroquinoline-N-carboxylate, benzyl 1,4-dihydroquinoline-N-carboxylate, α-phenethyl 1,4 - dihydroquinoline-N-carboxylate, β-phenethyl 1,4-dihydroquinoline-N-carboxylate, β-bromoethyl 1,4 - dihydroquinoline - N - carboxylate, β-chloroethyl 1,4-dihydroquinoline-N-carboxylate, β-iodoethyl 1,4-dihydroquinoline-N-carboxylate, β-fluoroethyl 1,4-dihydroquinoline-N-carboxylate, γ-chloropropyl 1,4-dihydroquinoline-N-carboxylate, δ-chlorobutyl 1,4-dihydroquinoline-N-carboxylate, p-methylbenzyl 1,4-dihydroquinoline-N-carboxylate, o-methoxybenzyl 1,4-dihydroquinoline-N-carboxylate, p-methoxybenzyl 1,4 - dihydroquinoline-N-carboxylate, o-chlorobenzyl 1,4-dihydroquinoline-N-carboxylate, m-bromobenzyl 1,4 - dihydroquinoline-N-carboxylate, p-iodobenzyl 1,4-dihydroquinoline-N-carboxylate, o-fluorobenzyl 1,4-dihydroquinoline-N-carboxylate, p-trifluoromethylbenzyl 1,4-dihydroquinoline-N-carboxylate, p-chlorophenylisopropyl 1,4-dihydroquinoline-N-carboxylate, m-methoxybenzyl 1,4 - dihydroquinoline-N-carboxylate, o,p,dichlorobenzyl 1,4-dihydroquinoline-N-carboxylate, o,o'-dimethoxybenzyl 1,4 - dihydroquinoline-N-carboxylate and o,p-dimethylbenzyl 1,4-dihydroquinoline-N-carboxylate, respectively.

EXAMPLE 3

When, in the procedure of Example 1, ethyl chloroformate is replaced by an equimolar weight of isobutyl chlorothionformate, isopropyl chlorothionformate, ethyl chlorothionformate, t-butyl chlorothionformate, methyl chlorothionformate, propargyl chlorothionformate, n-butyl chlorothionformate, allyl chlorothionformate, methallyl chlorothionformate, cyclopropyl chlorothionformate, cyclohexyl chlorothionformate, cyclohetenyl chlorothionformate, benzyl chlorothionformate, α-phenethyl chlorothionformate, β-phenethyl chlorothionformate, β-bromoethyl chlorothionformate, β-iodoethyl chlorothionformate, β-fluoroethyl chlorothionformate, γ - chloropropyl chlorothionformate, δ-chlorobutyl chlorothionformate, p-methylbenzyl chlorothionformate, o-methoxybenzyl chlorothionformate, p-methoxybenzyl chlorothionformate, o-chlorobenzyl chlorothionformate, m-bromobenzyl chlorothionformate, p-iodobenzyl chlorothionformate, o-fluorobenzyl chlorothionformate, p-trifluoromethylbenzyl chlorothionformate, p-chlorophenylisopropyl chlorothionformate, m-methoxybenzyl chlorothionformate, o,p-dichlorobenzyl chlorothionformate, o,o'-dimethoxybenzyl chlorothionformate and o,p-dimethylbenzyl chlorothionformate, there are obtained, isobutyl 1,4-dihydroquinoline-N-thioncarboxylate, isopropyl 1,4-dihydroquinoline-N-thioncarboxylate, ethyl 1,4-dihydroquinoline-N-thioncarboxylate, t-butyl 1,4-dihydroquinoline-N-thioncarboxylate, methyl 1,4-dihydroquinoline-N-thioncarboxylate, propargyl 1,4-dihydroquinoline-N-thioncarboxylate, n-butyl 1,4-dihydroquinoline-N-thioncarboxylate, allyl 1,4-dihydroquinoline-N-thioncarboxylate, methallyl 1,4-dihydroquinoline-N-thioncarboxylate, cyclopropyl 1,4-dihydroquinoline-N-thioncarboxylate, cyclohexyl 1,4-dihydroquinoline-N-thioncarboxylate, cycloheptenyl 1,4-dihydroquinoline-N-thioncarboxylate, benzyl 1,4-dihydroquinoline-N-thioncarboxylate, α-phenethyl 1,4-dihydroquinoline-N-thioncarboxylate, β-phenethyl 1,4-dihydroquinoline-N-thioncarboxylate, β-bromoethyl 1,4-dihydroquinoline-N-thioncarboxylate, β-iodoethyl 1,4-dihydroquinoline-N-thioncarboxylate, β-fluoroethyl 1,4-dihydroquinoline-N-thioncarboxylate, γ-chloropropyl 1,4-dihydroquinoline-N-thioncarboxylate, δ-chlorobutyl 1,4-dihydroquinoline-N-thioncarboxylate, p-methylbenzyl 1,4-dihydroquinoline-N-thioncarboxylate, o-methoxybenzyl 1,4-dihydroquinoline-N-thioncarboxylate, p-methoxybenzyl 1,4-dihydroquinoline-N-thioncarboxylate, o-chlorobenzyl 1,4-dihydroquinoline-N-thioncarboxylate, m-bromobenzyl 1,4-dihydroquinoline-N-thioncarboxylate, p-iodobenzyl 1,4-dihydroquinoline-N-thioncarboxylate, o-fluorobenzyl 1,4-dihydroquinoline-N-thioncarboxylate, p-trifluoromethylbenzyl 1,4-dihydroquinoline-N-thioncarboxylate, p-chlorophenylisopropyl 1,4-dihydroquinoline-N-thioncarboxylate, m-methoxybenzyl 1,4-dihydroquinoline-N-thioncarboxylate, o,p-dichlorobenzyl 1,4-dihydroquinoline-N-thioncarboxylate, o,o'-dimethoxybenzyl 1,4-dihydroquinoline-N-thioncarboxylate and o,p-dimethylbenzyl 1,4-dihydroquinoline-N-thioncarboxylate, respectively.

To illustrate the nomenclature used herein, isopropyl chlorothionformate has the structure

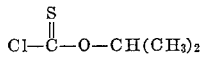

and isopropyl 1,4-dihydroquinoline-N-thioncarboxylate has the structure

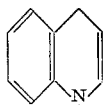

EXAMPLE 4

When, in the procedure of Example 1, o-nitrocinnamaldehyde diethylacetal is replaced by an equimolar weight of 2 - nitro - 6 - chlorocinnamaldehyde diethylacetal, 2-nitro - 5 - methoxycinnamaldehyde diethylacetal, 2-nitro-5-bromocinnamaldehyde diethylacetal, 2 - nitro - 4 - iodocinnamaldehyde diethylacetal, 2 - nitro - 4 - fluorocinnamaldehyde diethylacetal, 2 - nitro - 4,6-dichlorocinnamaldehyde diethylacetal, 2 - nitro - 4,6 - dimethylcinnamaldehyde diethlacetal, 2 - nitro - 4 - aminocinnamaldehyde diethylacetal, 2 - nitro - 6 - methylcinnamaldehyde diethylacetal, 2 - nitro - 4 - methylcinnamaldehyde diethylacetal, 2 - nitro - 5 - chlorocinnamaldehyde diethylacetal, 2 - nitro - 4 - bromocinnamaldehyde diethylacetal, 2 - nitro - 5 - iodocinnamaldehyde diethylacetal, 2 - nitro-5 - methylcinnamaldehyde diethylacetal, 2 - nitro - 6 - ethoxycarbonylaminocinnamaldehyde diethylacetal, 2-nitro - 5 - ethylcinnamaldehyde diethylacetal, 2 - nitro-5-methylthiocinnamaldehyde diethylacetal, 2 - nitro - 6 - chloro - 6 - methylcinnamaldehyde diethylacetal, 2 - nitro-5 - diethylaminomethylcinnamaldehyde diethylacetal, 2-nitro - 5 - chloro - 5 - methylcinnamaldehyde diethylacetal, 2 - nitro - 4 - chloro - 6 - methylcinnamaldehyde diethylacetal, 2 - nitro - 5 - cyanocinnamaldehyde diethylacetal, 2 - nitro - 6 - bromocinnamaldehyde diethylacetal, 2 - nitro - 6 - trifluoromethylcinnamaldehyde diethylacetal, 2 - nitro - 5 - trifluoromethylcinnamaldehyde diethylacetal, 2 - nitro - 5 - methyl - 7 - trifluoromethylcinnamaldehyde diethylacetal, 2 - nitro - 6 - methoxycinnamaldehyde diethylacetal, 2 - nitro - 6 - acetoxycinnamaldehyde diethylacetal, 2 - nitro - 4 - dimethylaminocinnamaldehyde diethylacetal, 2 - nitro - 6 - methylsulfonylcinnamaldehyde diethylacetal and 2 - nitro - 4 - diethylaminocinnamaldehyde diethylacetal, there are obtained, ethyl 5-chloro - 1,4 - dihydroquinoline - N - carboxylate, ethyl 6-methoxy - 1,4 - dihydroquinoline - N - carboxylate, ethyl 6- bromo-1,4 - dihydroquinoline - N - carboxylate, ethyl 7 - iodo - 1,4 - dihydroquinoline - N - carboxylate, ethyl 7 - fluoro - 1,4 - dihydroquinoline - N - carboxylate, ethyl 5,7 - dichloro - 1,4 - dihydroquinoline - N - carboxylate, ethyl 5,7 - dimethyl - 1,4 - dihydroquinoline - N - carboxylate, ethyl 7 - amino - 1,4 - dihydroquinoline - N-carboxylate, ethyl 5 - methyl - 1,4 - dihydroquinoline-N-carboxylate, ethyl 7 - methyl - 1,4 - dihydroquinoline-N-carboxylate, ethyl 6 - chloro - 1,4 - dihydroquinoline-N-carboxylate, ethyl 7 - bromo - 1,4 - dihydroquinoline-N-carboxylate, ethyl 6 - iodo - 1, 4- dihydroquinoline-N-carboxylate, ethyl 6 - methyl - 1, 4 - dihydroquinoline-N-carboxylate, ethyl 5 - ethoxycarbonylamino - 1,4 - dihydroquinoline-N-carboxylate, ethyl 6 - ethyl - 1,4 - dihydroquinoline-N-carboxylate, ethyl 6 - methylthio-1,4-dihydroquinoline-N-carboxylate, ethyl 5 - chloro - 6 - methyl-1,4-dihydroquinoline - N - carboxylate, ethyl 6 - diethylamino methyl - 1,4 - dihydroquinoline-N-carboxylate, ethyl 6-chloro - 5 - methyl - 1,4-dihydroquinoline-N-carboxylate, ethyl 7 - chloro - 6 - methyl - 1,4-dihydroquinoline-N-carboxylate, ethyl 6 - cyano - 1,4 - dihydroquinoline-N-carboxylate, ethyl 5 - bromo - 1,4 - dihydroquinoline-N-carboxylate, ethyl 5 - trifluoromethyl - 1,4-dihydroquinoline-N-carboxylate, ethyl 6 - trifluoromethyl-1,4-dihydroquinoline-N-carboxylate, ethyl 6 - methyl - 7 - trifluoromethyl - 1,4 - dihydroquinoline-N-carboxylate, ethyl 5-methoxy - 1,4 - dihydroquinoline-N-carboxylate, ethyl 5-acetoxy - 1,4 - dihydroquinoline-N-carboxylate, ethyl 7-dimethylamino - 1,4 - dihydroquinoline - N-carboxylate, ethyl 5 - methylsulfonyl - 1,4 - dihydroquinoline-N-carboxylate and ethyl 7 - diethylamino - 1,4 - dihydroquinoline-N-carboxylate, respectively.

Ethyl esters of the corresponding 1,4-dihydroquinoline-N-carboxylic thion acids are produced by substituting an equimolar weight of ethyl chlorothionformate for the ethyl chloroformate used above.

EXAMPLE 5

Preparation of ethyl 5-amino-1,4-dihydroquinoline

Substitution of an equimolar weight of 6-carbobenzoxyamino-o-nitrocinnamaldehyde diethylacetal for o-nitrocinnamaldehyde diethylacetal in the procedure of Example 1 as modified by inclusion of the additional step between Steps B and C of hydrogenolysis in the presence of palladium on carbon of 3-(6-carbobenzoxyamino-2-ethoxycarbamylphenyl)propionaldehyde diethylacetal produced in Step B to produce 3-(6-amino-2-ethoxycarbamylphenyl)-propionaldehyde diethylacetal gives the product ethyl 5-amino-1,4-dihydroquinoline.

EXAMPLE 6

Preparation of ethyl 6-hydroxy-1,4-dihydroquinoline-N-carboxylate

Substitution of an equimolar weight of 5-benzyloxy-o-nitrocinnamaldehyde diethylacetal for o-nitrocinnamaldehyde diethylacetal in the procedure of Example 1 as modified by inclusion of the additional step between Steps B and C of hydrogenolysis in the presence of palladium on carbon of 3 - (5-benzyloxy-2-ethoxycarbamylphenyl)propionaldehyde diethylacetal produced in Step B to produce 3 - (5 - hydroxy - 2-ethoxycarbamylphenyl)-propionaldehyde diethylacetal gives the product, ethyl 6-hydroxy-1,4-dihydroquinoline-N-carboxylate.

While this invention has been described and exemplified in terms of its preferred embodiment, those skilled in the art will appreciate that modifications can be made

We claim:
1. The compounds of the formula

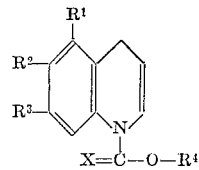

wherein two of the groups $R^1$, $R^2$ and $R^3$ are hydrogen and the other is hydrogen, chloro, bromo, iodo, fluoro, trifluoromethyl, methyl, ethyl, methoxy, ethoxy, methylthio, ethylthio, methylsulfonyl, hydroxy, acetoxy, amino, or a group of the formula

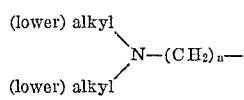

wherein $n$ is an integer from zero to three inclusive and each (lower)alkyl group is methyl or ethyl;
X is oxygen or sulfur, and
$R^4$ is (lower)alkyl, (lower)alkenyl, (lower)alkynyl, cycloalkyl having from three to eight carbon atoms inclusive, halo(lower)alkyl other than α-haloalkyl or a radical of the formula

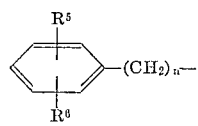

wherein $n$ is an integer from one to three inclusive and $R^5$ and $R^6$ each are hydrogen, (lower)alkyl, (lower)alkoxy, chloro, bromo, iodo, fluoro or trifluoromethyl; and their nontoxic pharmaceutically acceptable acid addition salts.

2. The compounds of claim 1 having the formula

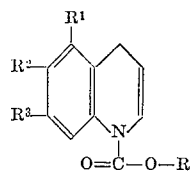

wherein R is (lower)alkyl and two of the groups $R^1$, $R^2$ and $R^3$ are hydrogen and the other is hydrogen, methyl, ethyl, chloro, bromo, iodo, amino, dimethylamino or diethylamino; and their nontoxic pharmaceutically acceptable acid addition salts.

3. The compounds of claim 1 having the formula

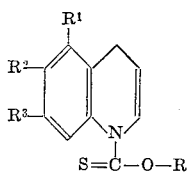

wherein R is (lower)alkyl and two of the groups $R^1$, $R^2$ and $R^3$ are hydrogen and the other is hydrogen, methyl, ethyl, chloro, bromo, iodo, amino, dimethylamino or diethylamino; and their nontoxic pharmaceutically acceptable acid addition salts.

4. The compounds of claim 1 having the formula

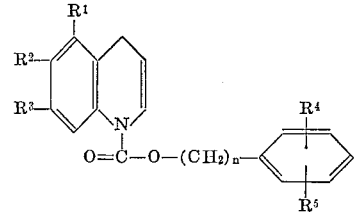

wherein two of the groups $R^1$, $R^2$ and $R^3$ are hydrogen and the other is hydrogen, methyl, ethyl, chloro, bromo, iodo, amino, dimethylamino or diethylamino,
$n$ is one, two or three and
$R^4$ and $R^5$ each are hydrogen, (lower)alkyl, (lower)alkoxy, chloro, bromo, iodo, fluoro, or trifluoromethyl; and their nontoxic, pharmaceutically acceptable acid addition salts.

5. The compounds of claim 1 having the formula

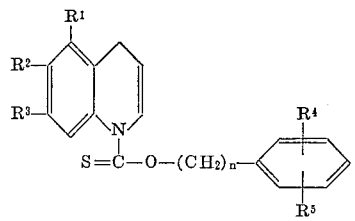

wherein two of the groups $R^1$, $R^2$ and $R^3$ are hydrogen and the other is hydrogen, methyl, ethyl, chloro, bromo, iodo, amino, dimethylamino or diethylamino,
$n$ is one, two or three, and
$R^4$ and $R^5$ each are hydrogen, (lower)alkyl, (lower)alkoxy, chloro, bromo, iodo, fluoro or trifluoromethyl; and their nontoxic, pharmaceutically acceptable acid addition salts.

6. The compounds of claim 1 which are (lower)alkyl, (lower)alkenyl or (lower)alkynyl esters of 1,4-dihydroquinoline-N-carboxylic acid.

7. The compounds of claim 1 which are (lower)alkyl, (lower)alkenyl or (lower)alkynyl thionesters of 1,4-dihydroquinoline-N-carboxylic acid.

8. The compounds of claim 1 having the formula

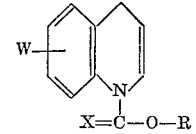

wherein W is methyl, halogen, amino, dimethylamino or diethylamino and is attached at the 5,6, or 7-position, R is (lower)alkyl and X is oxygen or sulfur; and their nontoxic, pharmaceutically acceptable acid addition salts.

9. The compounds of claim 1 having the formula

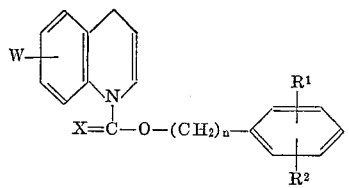

wherein W is methyl, halogen, amino, dimethylamino or diethylamino and is attached at the 5-, 6-, or 7-position;
X is oxygen or sulfur;
$n$ is one, two or three; and
$R^1$ and $R^2$ each is hydrogen, (lower)alkyl, (lower)alkoxy, chloro, bromo, iodo, fluoro or trifluoromethyl; and their nontoxic pharmaceutically acceptable acid addition salts.

10. The compounds of claim 1 having the formula $$X=\overset{}{\underset{}{C}}-O-R$$ (on quinoline N)

wherein R is (lower)alkyl and X is oxygen or sulfur.

11. The compounds of claim 1 having the formula $$X=\overset{}{\underset{}{C}}-O-(CH_2)_n-\text{phenyl}$$ (on quinoline N)

wherein X is oxygen or sulfur and n is one, two or three.

12. The compound having the formula $$O=\overset{}{\underset{}{C}}-O-C_2H_5$$ (on quinoline N)

13. The compound having the formula $$O=\overset{}{\underset{}{C}}-O-CH_3$$ (on quinoline N)

14. The compound having the formula $$O=\overset{}{\underset{}{C}}-O-C_2H_5$$ (on quinoline N, with H₃C— on ring)

15. The compound having the formula $$S=\overset{}{\underset{}{C}}-O-C_2H_5$$ (on quinoline N)

16. The compound having the formula $$O=\overset{}{\underset{}{C}}-C-CH_2CH_3$$ (on quinoline N, with H₃C— on ring)

17. The compound having the formula $$O=\overset{}{\underset{}{C}}-O-CH_2CH_3$$ (on quinoline N, with Cl— on ring)

18. The compound having the formula $$O=\overset{}{\underset{}{C}}-O-CH_2CH_3$$ (on quinoline N, with NH₂ on ring)

and its nontoxic, pharmaceutically acceptable acid addition salts.

References Cited

UNITED STATES PATENTS

| | | | |
|---|---|---|---|
| 2,623,046 | 12/1952 | Cusic | 260—287 X |
| 2,650,919 | 9/1953 | Cusic | 260—287 X |
| 2,857,387 | 10/1958 | Beaver et al. | 260—287 |

ALEX MAZEL, Primary Examiner

D. G. DAUS, Assistant Examiner

U.S. Cl. X.R.

260—286, 327, 340.5, 340.6, 505, 543, 544, 562, 571, 609, 611, 690; 424—258